(12) United States Patent
Presby

(10) Patent No.: US 6,534,741 B2
(45) Date of Patent: Mar. 18, 2003

(54) METHOD OF MAKING AN OPTICAL FIBER

(75) Inventor: Herman M. Presby, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/852,199

(22) Filed: May 9, 2001

(65) Prior Publication Data

US 2001/0031120 A1 Oct. 18, 2001

Related U.S. Application Data

(62) Division of application No. 09/133,731, filed on Aug. 13, 1998, now abandoned.

(51) Int. Cl.[7] ............................................. B23K 26/38
(52) U.S. Cl. .................................... 219/121.69; 65/392
(58) Field of Search ................. 219/121.68, 121.69; 65/392; 216/24, 65

(56) References Cited

U.S. PATENT DOCUMENTS

| | | | |
|---|---|---|---|
| 3,865,564 A | * | 2/1975 | Jaeger et al. |
| 3,981,705 A | * | 9/1976 | Jaeger et al. .......... 219/121.85 |
| 4,049,413 A | * | 9/1977 | French |
| 4,170,726 A | | 10/1979 | Okuda |
| 4,265,699 A | | 5/1981 | Ladany ...................... 156/657 |
| 4,710,605 A | * | 12/1987 | Presby ....................... 219/121.85 |
| 4,820,321 A | * | 4/1989 | Presby ........................... 65/2 |
| 4,875,969 A | | 10/1989 | Hsu et al. ................... 156/633 |
| 4,880,494 A | | 11/1989 | Kaukeinen et al. ......... 156/633 |
| 5,029,966 A | | 7/1991 | Serapins et al. |
| 5,149,937 A | | 9/1992 | Babel et al. ........... 219/121.68 |
| 5,395,741 A | | 3/1995 | Marchman .................. 430/320 |
| 5,954,974 A | * | 9/1999 | Broer et al. .................. 216/24 |

FOREIGN PATENT DOCUMENTS

DE  29 38 910 A1  4/1980

OTHER PUBLICATIONS

Presby, H.M., "Extended Optical Fiber and Method", U.S. patent application, Ser. No. 09/133,731, Aug., 13, 1998.

* cited by examiner

*Primary Examiner*—Geoffrey S. Evans
(74) *Attorney, Agent, or Firm*—Thomas, Kayden, Horstemeyer & Risley LLP

(57) ABSTRACT

A laser beam is used to ablate the outer cladding of an extended portion of an optical fiber. The laser beam is focused at a tangential point on the outer cladding. The laser can be rotated around the optical fiber while the optical fiber is held stationary. Alternatively the optical fiber can be rotated while the focal point of the laser beam is kept at a constant position.

8 Claims, 6 Drawing Sheets

METHOD OF MAKING AN OPTICAL FIBER

CROSS-REFERENCE TO RELATED APPLICATION

This Application is a divisional of U.S. utility application entitled, "EXTENDED OPTICAL FIBER AND METHOD," having Ser. No. 09/133,731, filed Aug. 13, 1998, now abandoned which is entirely incorporated herein by reference.

FIELD OF THE INVENTION

This invention relates to the field of optical waveguides, and more particularly, to the field of machining of optical waveguides using a laser.

BACKGROUND OF THE INVENTION

Currently, fiber optic technology is used in high speed communication systems. These systems facilitate the communication of video, data, and voice information through vast networks around the globe. Among the components which are used in such systems are various photodetectors which generally receive laser signals from optical fibers, converting them to electrical signals.

In general, photodetectors feature an active area or photosensitive surface which reacts to incident radiation, creating a corresponding electrical signal. In a typical configuration, an optical fiber is directed toward the active area of the photodetector so that laser radiation that propagates through the optical fiber falls on the active area. Accordingly, such photodetectors typically include input ports to receive and position optical fibers.

Some photodetectors such as various super high speed photodetectors employ narrow input ports or openings through which to receive the optical fiber. Whereas a typical single mode optical fiber may be 125 microns in diameter, these narrow input ports may range anywhere from approximately 10 microns to 50 microns in diameter. Consequently, there is a need for an optical fiber cable that will fit into such narrow input ports while maintaining proper propagation characteristics.

SUMMARY OF THE INVENTION

To address this need, the present invention entails an extended optical fiber having an extended portion and a normal portion. The extended portion is located at an end of the extended optical fiber and has a cladding of reduced diameter in relation with the cladding of the normal portion. A common core runs throughout the normal and extended portions. The thickness of the cladding in the extended portion is sufficient to ensure that the propagation characteristics of the extended optical fiber are unaffected through the extended portion. The extended portion provides the advantage of being easily inserted into a restrictive input port of a photodetector or other device.

The present invention may also be viewed as a method for producing the extended optical fiber. This method includes the steps of focusing a laser on a tangential point of the cladding material of an optical fiber resulting in the tangential ablation of the cladding material. Next, a reduced diameter section is created in the cladding material by rotating the optical fiber under the focus of the laser and moving the optical fiber in a linear direction into the focused laser. Finally, the optical fiber is cleaved at the reduced diameter section, resulting in an extended optical fiber according to the present invention.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
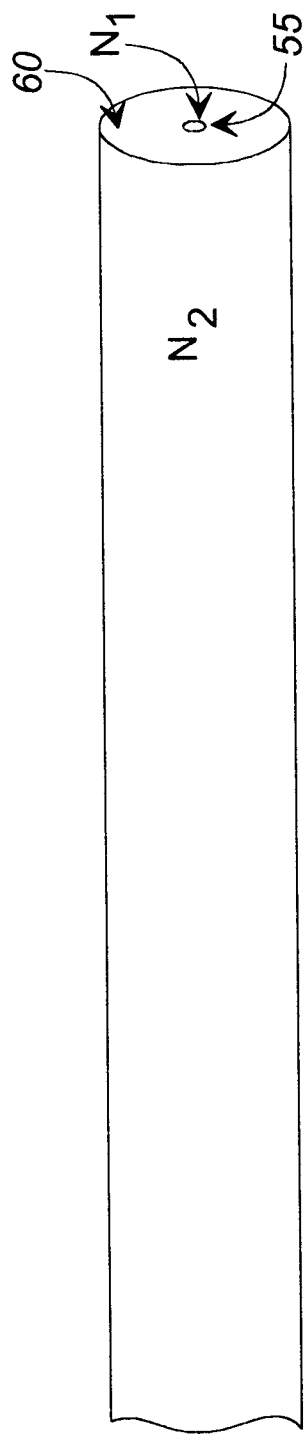
FIG. 1 is a drawing showing a conventional optical fiber.

Turning to FIG. 1, shown is a conventional optical fiber 50 having a core 55 surrounded by a cladding 60. The core 55 has an index of refraction $N_1$ which is greater than the index of refraction $N_2$ of the cladding 60. This relationship between the indexes of refraction where $N_1 > N_2$ allows the propagation of light waves through the core 55 of the optical fiber 50, reflecting off of the sides of the core 55 along the way. Such characteristics of an optical fiber are well known by those skilled in the art. By way of example, the diameter of the core 55 may be approximately 10 microns and the diameter of the cladding 60 may be approximately 125 microns for a single mode optical fiber, or the diameter of the core 55 may be approximately 60 microns with a cladding 60 of approximately 125 microns for a multimode fiber.

Figure 2:
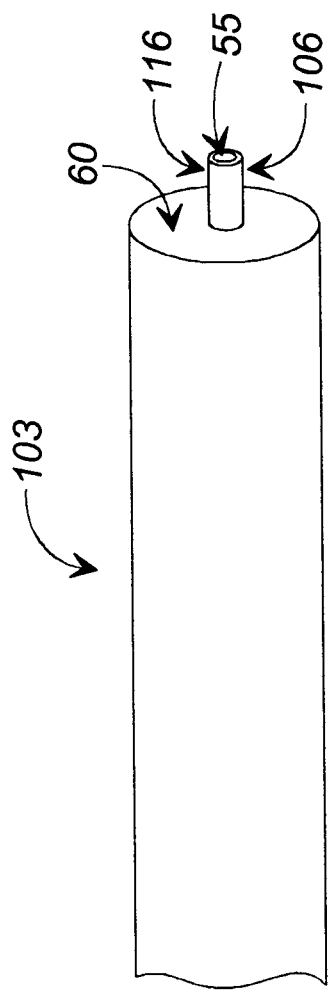
FIG. 2 is a drawing showing an optical fiber with an extended portion according to an embodiment of the present invention.

Referring next to FIG. 2, shown is an extended optical fiber 100 according to a first embodiment of the present invention. Although other methods may exist in which the extended optical fiber 100 may be produced, according to the preferred embodiment, the extended optical fiber 100 is created using a cladding ablation process applied to an optical fiber such as the optical fiber 50 of FIG. 1.

The extended optical fiber 100 includes a normal portion 103 having cladding 60 of regular thickness and an extended portion 106. The extended optical fiber 100 includes a core 55 which extends through both the normal portion 103 and the extended portion 106. In the normal portion 103, the core 55 is surrounded by the cladding 60 which is generally the cladding 60 (FIG. 1) of an optical fiber 50 before the cladding ablation process is applied. In the extended portion 106, the core 55 is surrounded by a reduced cladding 116 having an identifiable reduced thickness resulting in a reduced diameter.

The reduced cladding 116 may vary in thickness, depending upon the application. In the preferred embodiment, the reduced cladding 116 is of residual thickness, providing only enough cladding material around the core 55 to maintain the propagation characteristics of the extended optical fiber 100 through the extended portion 106. The amount of cladding material needed around the core 55 to maintain the propagation characteristics of the entire extended optical fiber 100 acts as a minimum threshold for the identifiable reduced thickness of the extended portion 106. The reduced cladding 116 of the extended portion 106 provides an advantage in that its reduced overall diameter of the extended portion 106 may be inserted into input ports of photodetectors and other devices that will not accommodate the diameter of the normal portion 103 of the fiber optic cable 100. The actual diameter of the extended portion 106 might be, for example, 20 microns where the thickness of the reduced cladding is 10 microns.

Figure 3:
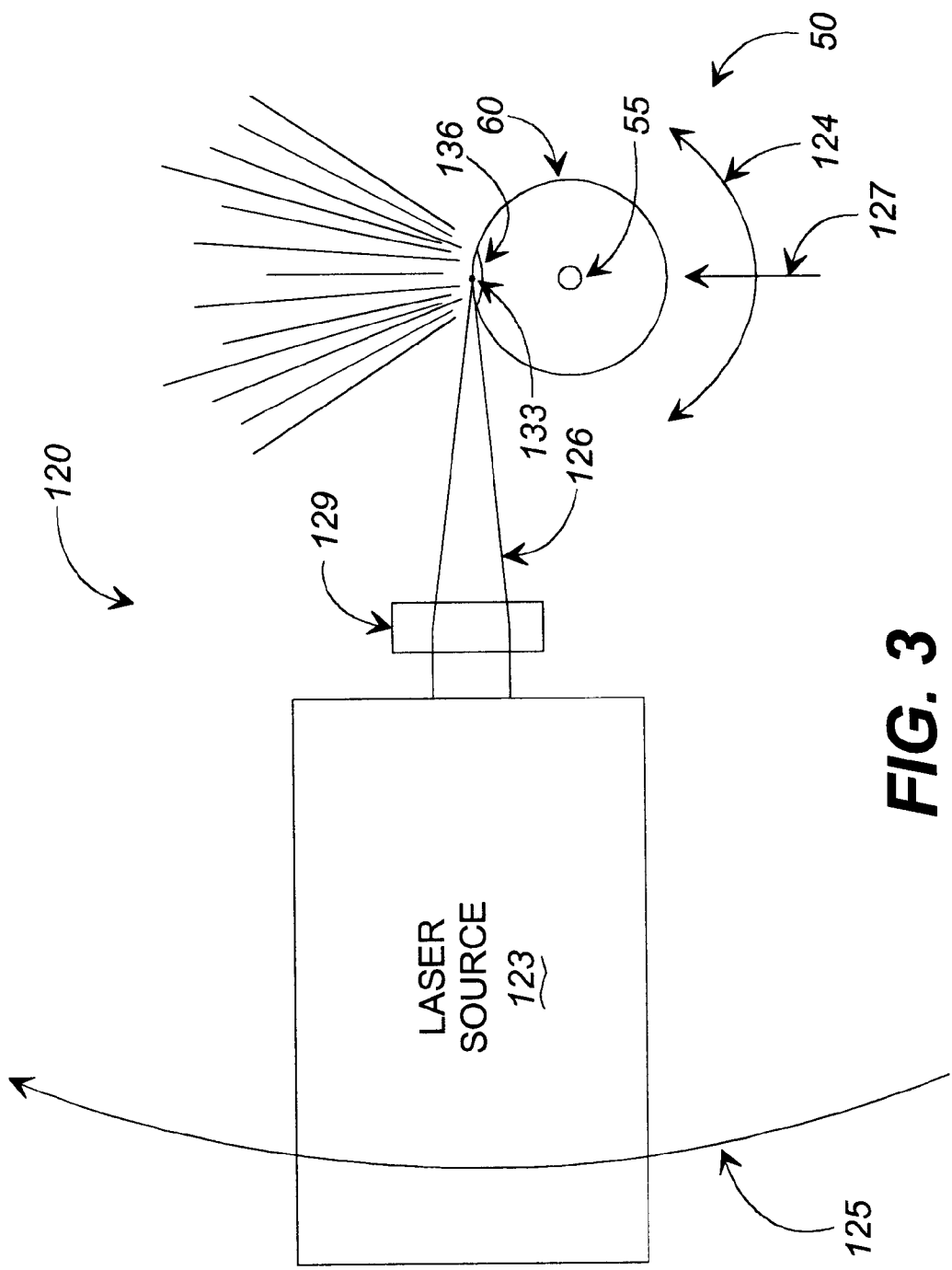
FIG. 3 is a drawing showing the machining of the optical fiber of FIG. 1 using a laser according to an embodiment of the present invention.

Turning to FIG. 3, shown is an optical lathe system 120 for creating an extended optical fiber 100 (FIG. 2) according to an embodiment of the present invention. The optical lathe system 120 is employed in a cladding ablation process to achieve the extended core optical fiber 100. The optical lathe system 120 is comprised of a laser source 123 which generates a laser beam 126. The laser beam is focused by a lens 129 onto a tangential point 133 on the surface of the cladding 60 (FIG. 1) of an optical fiber 50 (FIG. 1). A tangential region 136 around the point is ablated under the focus of the laser 126. After initial contact is established between the laser 126 and the tangential point 133, the optical fiber 50 is placed in a slow rotation shown generally by arrow 124 clockwise or counterclockwise so as to cause ablation around the entire cladding 60 of the optical fiber 50 at the depth of the tangential region. At the same time, the optical fiber 50 is placed in a slow linear motion shown by arrow 127 so that the focal point of the laser 126 reaches deeper into the cladding 60 of the optical fiber 50 with each rotation as indicated by arrow 124, causing ablation of the cladding 60 of increasing depth. The linear motion depicted by arrow 127 is stopped when the cladding 60 has been ablated to an identifiable depth. Thus, the rotation as indicated by arrow 124 and the linear motion as indicated by arrow 127 result in a section of the optical fiber 50 with an identifiable reduced diameter. If desired, the optical fiber 50 may be moved longitudinally resulting in a corkscrew motion if a longer reduced diameter section is desired. This reduced diameter is generally less than the diameter of the cladding 60, but greater than the diameter of the core 55. Note that the rotation as indicated by arrow 124 may also be achieved by the rotation shown by arrow 125 of the laser source 123 and the laser 126 around the optical fiber 50. The corresponding linear motion depicted by arrow 127 may be accomplished by moving the tangential point 136 in a linear direction toward the center of the optical fiber 50 during the rotation of arrow 125. Whether the optical fiber 50 or the laser 126 are rotated, the ultimate result is the same. Thus, it is important to establish a rotational relationship between the optical fiber 50 and the laser 129 to achieve the ablation about the perimeter while at the same time moving the tangential point 136 at which the laser 126 is focused in a linear motion of arrow 127 toward the center of the optical fiber 50. The linear motion as indicated by arrow 127 may also be termed a radial motion which is defined herein as movement in the direction of the tangential point 133 along the radius of the optical fiber 50 extending from the center of the optical fiber 50 to the tangential point 133.

Also note that the optical fiber 50 may be moved longitudinally along the axis of the optical fiber 50, or the laser 126 may be moved along the axis of the optical fiber 50 thereby resulting in the ablation of the cladding 60 along the axis of the optical fiber 50. Note such longitudinal movement when executed in conjunction with the forementioned rotational relationship results in ablation in a helical pattern.

Figure 4:
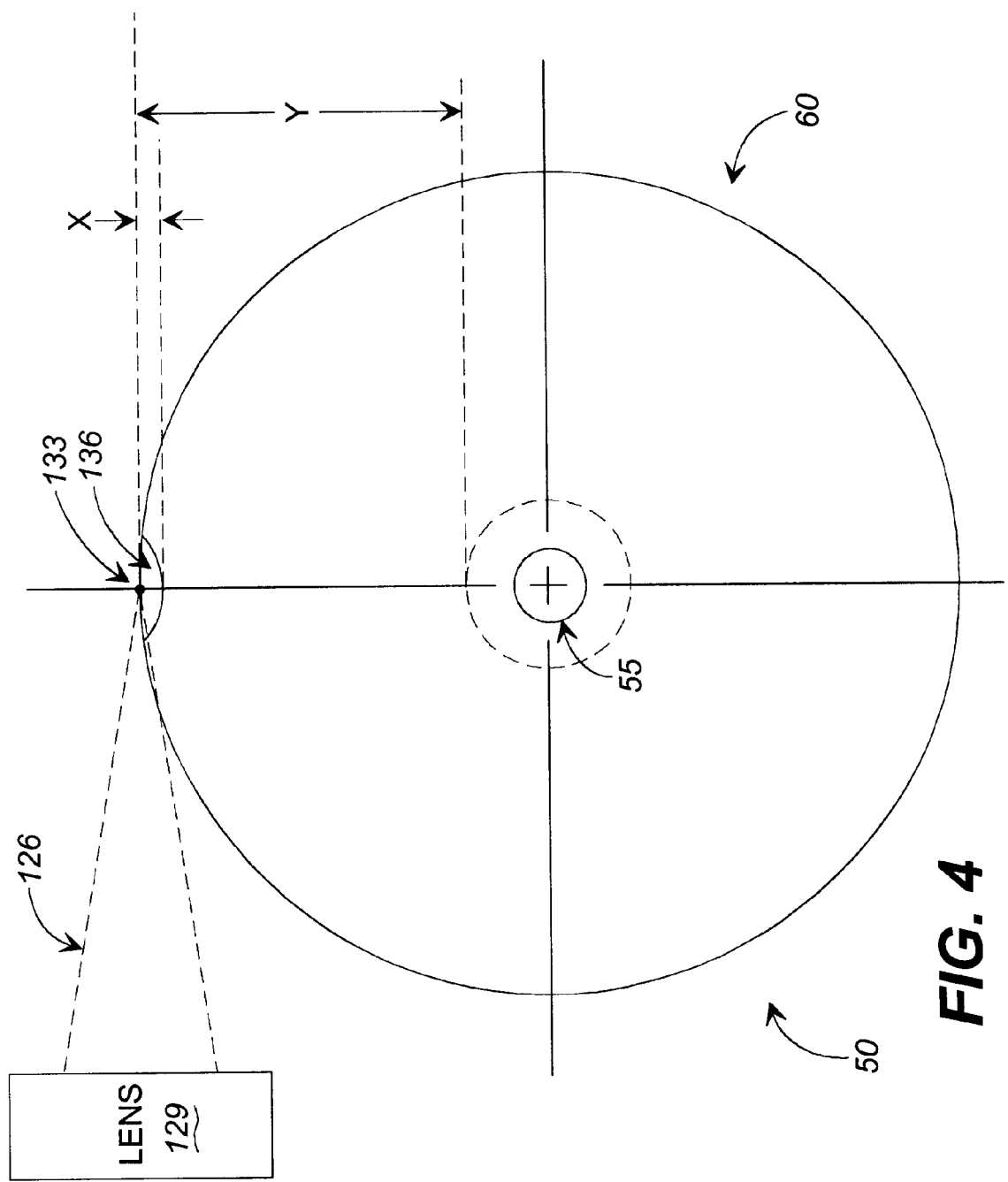
FIG. 4 is a drawing showing the tangential ablation of the optical fiber of FIG. 3.

Turning now, to FIG. 4, shown is a cross section of the optical fiber 50 and the laser of FIG. 3. The laser 126 is focused by the lens 129 at a tangential point 133 on the surface of the cladding 60 so as to achieve ablation of the cladding material of a depth X. The optical fiber 50 undergoes rotation and linear motion as previously described until the cladding material has been ablated to an identifiable depth Y. It is understood that the actual value for the identifiable depth Y vary according to the specific application. Note that it is preferable that the laser 126 be a carbon dioxide laser for best results, however it is understood that other types of lasers may be employed to achieve the desired effects, such as for example, YAG lasers or excimer lasers.

Figure 5:
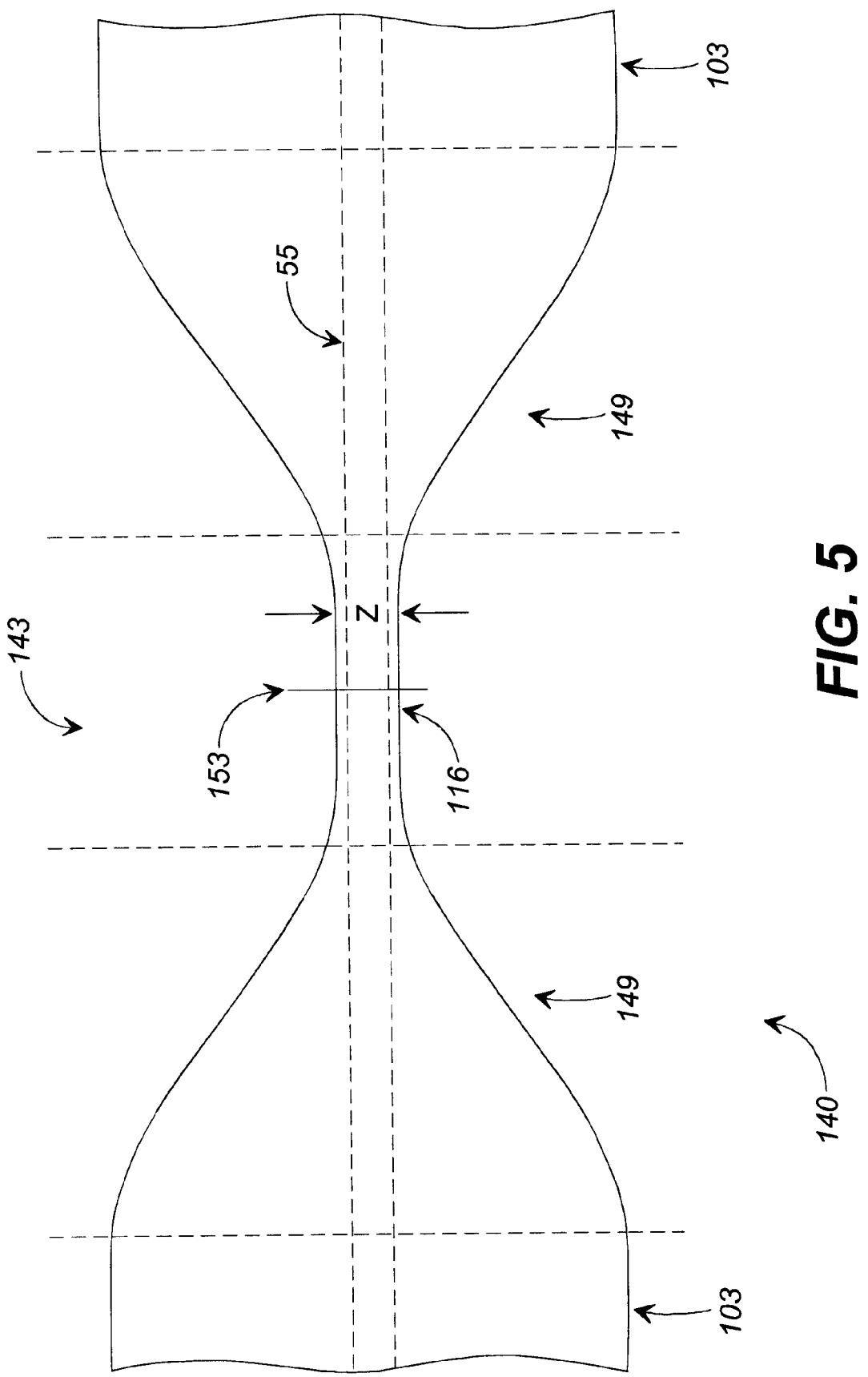
FIG. 5 is a drawing showing a side view of an optical fiber having a reduced diameter after machining as shown in FIG. 3.

Turning to FIG. 5, shown is a reduced diameter optical fiber 140 which has undergone the ablation process using the optical lathe system 120. The reduced diameter optical fiber 140 includes a reduced diameter section 143 between normal sections 103. By virtue of the ablation by the laser 126 (FIGS. 3 and 4), the reduced section 143 has a reduced cladding 116 resulting in the identifiable reduced diameter Z. The reduced diameter optical fiber 140 includes a core 55 that runs through the normal and reduced diameter sections 143 and 103. Between the normal sections 103 and the reduced diameter section 143 are tapered sections 149. The tapered sections 149 reflect the fact that the laser 126 does not cause ablation in perfect 90° angles as seen in the extended optical fiber 100 of FIG. 2. Instead the ablation generally rolls off as the distance from the focus point 136 (FIG. 4) increases.

Figure 6:
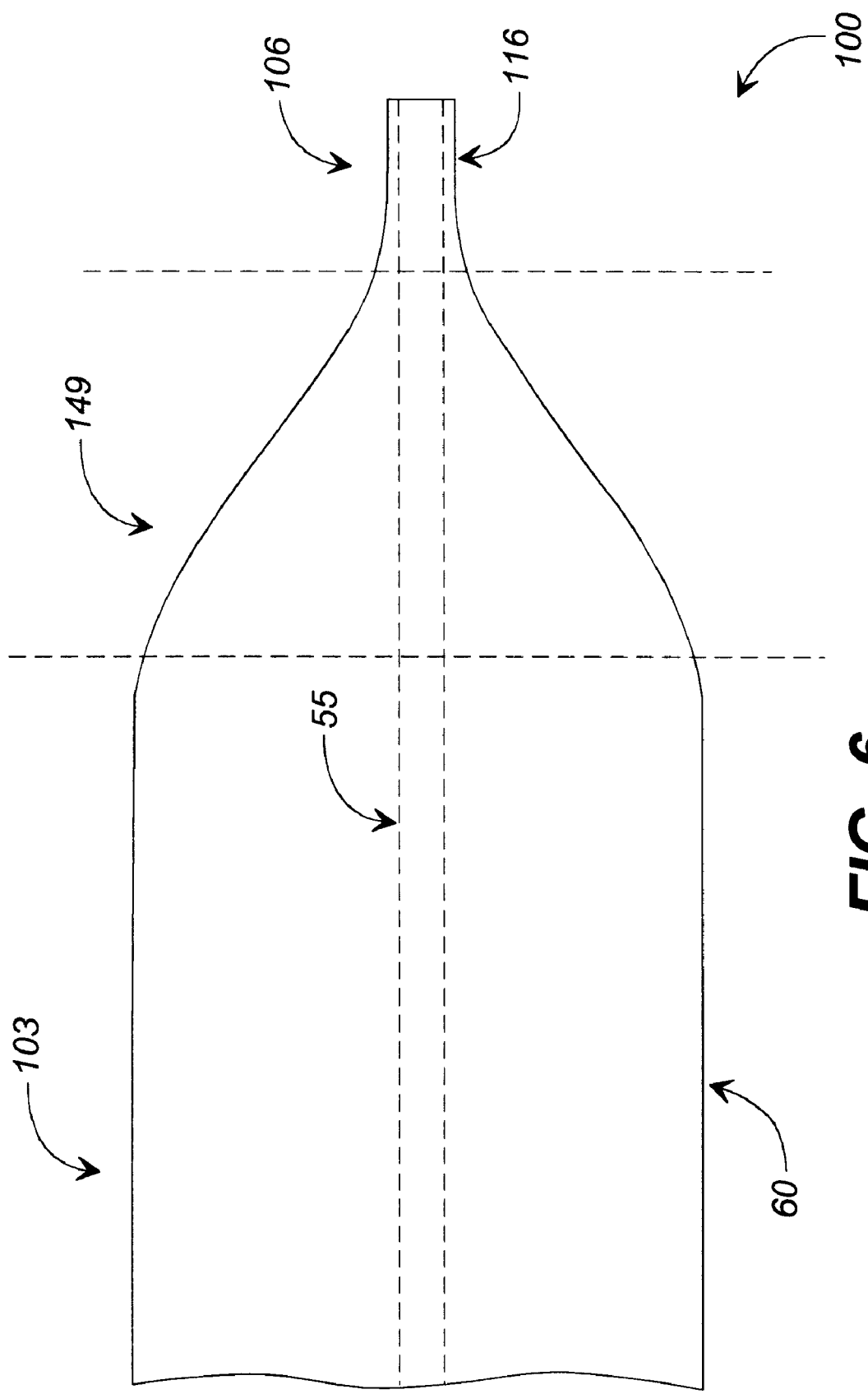
FIG. 6 is a drawing showing a cleaved side of the machined optical fiber of FIG. 5.

The reduced diameter optical fiber 140 is cleaved at an identifiable cleaving point 153 along the reduced diameter section 143. Referring then, to FIG. 6, shown is the resulting extended optical fiber 100 after the cleaving operation. Note that the tapered section 149 exists between the normal portion 103 and the extended portion 106. This tapered section 149 generally does not inhibit or otherwise effect the use of the extended optical fiber 100.

Figure 7B:
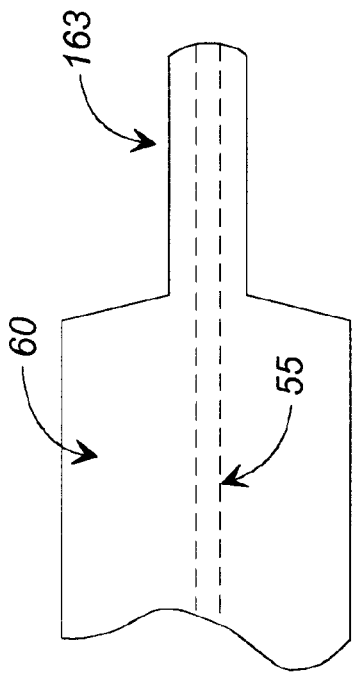
FIG. 7B is a drawing showing the end of the optical fiber of FIG. 7A after dipping.
Figure 7C:
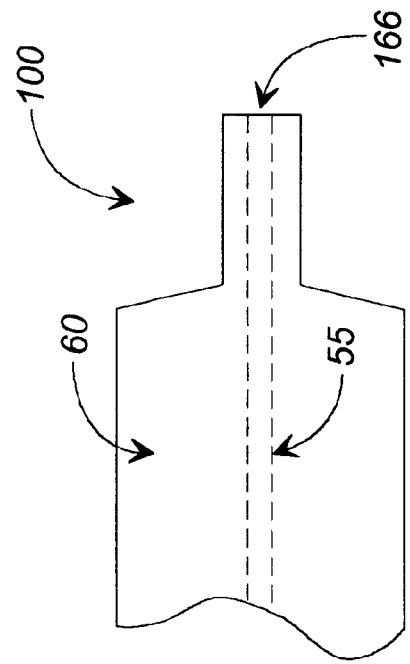
FIG. 7C is a drawing showing the end of the optical fiber of FIG. 7B after the extended portion is cleaved.
Figure 7A:
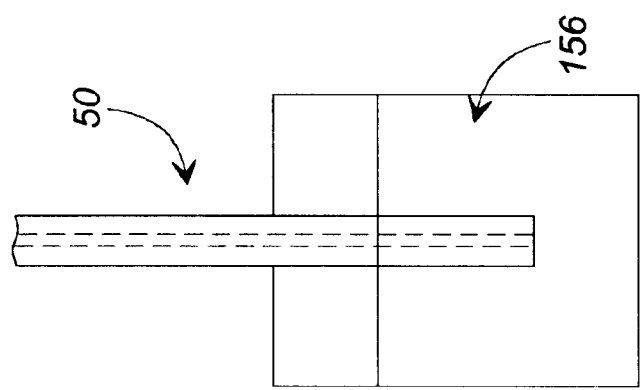
FIG. 7A is a drawing showing the dipping of an optical fiber into a solution according to a method of another embodiment of the present invention.

Turning to FIGS. 7A through 7C, shown is a method for creating the extended optical fiber 100 (FIG. 2) of according to another embodiment of the present invention. As shown in FIG. 7A, an end of an optical fiber 50 is dipped into a solution 156 such as hydrochloric acid or its equivalent which dissolves the cladding material. The optical fiber 50 may be dipped into the solution 156 for a specified period of time or may be dipped numerous times of short duration. The result as seen in FIG. 7B is an optical fiber 159 having an extended portion 163 with a reduced cladding 166 and a core 55 that has been dissolved where exposed to the solution 156 (FIG. 7A). In a final step, in FIG. 7C, the extended portion 163 is cleaved to provide a clean exit face 166 on the core 55 resulting in the extended optical fiber 100.

Many variations and modifications may be made to the embodiments of the invention without departing substantially from the spirit and principles of the invention. All such modifications and variations are intended to be included herein within the scope of the present invention, as defined by the following claims.

Having thus described the invention, it is claimed:

1. A method of making an optical fiber including:
a core having a first diameter;
an outer cladding surrounding the core composed of a cladding material, the outer cladding having a second diameter;
at least one end of the optical fiber having an extended portion, the extended portion having an extended core surrounded by an extended outer cladding having a third diameter, the third diameter being less than the second diameter and greater than the first diameter, comprising the step of:
   ablating the outer cladding of the extended portion with an optical lathe system, wherein the optical lathe system includes:
      a laser source;
      a laser beam generated by the laser source; and
      a lens that focuses the laser beam to a tangential point on the outer cladding.

2. The method of claim 1, wherein the step of ablating the outer cladding comprises ablating the extended portion of the outer cladding to a sufficient thickness to maintain a propagation of a light wave through the extended core.

3. The method of claim 1, further comprising the step of forming a tapered section having a fourth diameter, wherein the fourth diameter has a value between the second diameter and the third diameter.

4. A method for creating an extended core on an optical fiber having a core surrounded by a cladding material, the cladding material having an identifiable diameter, comprising the steps of:
   focusing a laser on a tangential point on the surface of the cladding material of the optical fiber, the laser causing an ablation of the cladding material at the tangential point;
   creating a rotational relationship between the optical fiber and the laser causing the ablation of the cladding material around the circumference of the optical fiber;
   moving the optical fiber radially into the focal point of the laser causing the ablation of the cladding material to an identifiable depth, the rotational relationship and the radial movement resulting in a reduced diameter portion of the optical fiber; and
   cleaving the optical fiber at the reduced diameter portion.

5. The method of claim 4, wherein the step of creating a rotation relationship further comprises the step of rotating the laser around the optical fiber, the optical fiber being held stationary.

6. The method of claimed 4, further comprising the step of moving the optical fiber in a longitudinal direction with respect to a longitudinal axis of the optical fiber, creating the ablation of the cladding material in a longitudinal direction.

7. The method of claim 4, wherein the step of focusing the laser further comprises the step of focusing a carbon dioxide laser at the tangential point.

8. The method of claim 4, wherein the step of creating a rotation relationship further comprises the step of rotating the optical fiber with the focal point of the laser being held stationary.

* * * * *